(12) United States Patent
Veldhuizen et al.

(10) Patent No.: US 8,301,469 B1
(45) Date of Patent: Oct. 30, 2012

(54) MORTGAGE INSURANCE SYSTEM

(76) Inventors: Mark Veldhuizen, Zoetermeer (NL); Johan Renes, Amersfoort (NL); Allen C. Turner, Salt Lake City, UT (US)

( * ) Notice: Subject to any disclaimer, the term of this patent is extended or adjusted under 35 U.S.C. 154(b) by 512 days.

(21) Appl. No.: 12/456,874

(22) Filed: Jun. 24, 2009

Related U.S. Application Data

(60) Provisional application No. 61/132,994, filed on Jun. 24, 2008.

(51) Int. Cl.
*G06Q 40/00* (2012.01)
(52) U.S. Cl. .............................................. 705/4; 705/38
(58) Field of Classification Search ............ 705/4, 35–40
See application file for complete search history.

(56) References Cited

U.S. PATENT DOCUMENTS

| | | | |
|---|---|---|---|
| 4,642,768 A | 2/1987 | Roberts | |
| 4,839,804 A | 6/1989 | Roberts et al. | |
| 5,884,274 A | 3/1999 | Walker et al. | |
| 6,128,598 A | 10/2000 | Walker et al. | |
| 6,272,471 B1 | 8/2001 | Segal | |
| 6,456,979 B1 | 9/2002 | Flagg | |
| 6,561,903 B2 | 5/2003 | Walker et al. | |
| 7,593,893 B1 * | 9/2009 | Ladd et al. | 705/38 |
| 2001/0027388 A1 | 10/2001 | Beverina et al. | |
| 2001/0027389 A1 | 10/2001 | Beverina et al. | |
| 2003/0074231 A1 | 4/2003 | Renes et al. | |
| 2003/0120521 A1 | 6/2003 | Sherman et al. | |
| 2003/0200124 A1 | 10/2003 | Kiramittchian et al. | |
| 2004/0254878 A1 * | 12/2004 | Fitzsimmons et al. | 705/38 |
| 2005/0038681 A1 | 2/2005 | Covert | |

OTHER PUBLICATIONS

"The Seventh Wife: A Novel", a review by amazon.co.jp (1994).
B. Levikson, Dept. of Statistics University of Haifa, http://stat.haifa.ac.il/~bennyl/ (2002).
Bakos et al. "Independent Inventors Get Lion's Share of Insurance Industry Patents", National Underwriter, 107(42): 1-3 (Oct. 20, 2003).
Bakos et al. "Product Development and Innovation in the Insurance Industry" USPTO Presentation (Nov. 20, 2003).
Bakos et al. "Protecting Your Insurance Patent, or, Millions of Dollars for Your Thoughts", National Underwriter, 108(14) (Apr. 19, 2004).
Bakos et al. "The End of Free Sharing in the Insurance Industry", National Underwriter Property & Casualty (Nov. 3, 2003).
Bakos et al. "The Mother of Invention", On The Risk, 19(3):66-71 (2003).

(Continued)

*Primary Examiner* — Olabode Akintola
(74) *Attorney, Agent, or Firm* — TraskBritt

(57) ABSTRACT

Described is a system for offering financing to a couple seeking financing for the purchase of real estate, the improvement comprising gathering information from the couple regarding the couple and the piece of residential real estate; calculating, with computerized software, a divorce insurance policy premium for the couple based upon this and other information; determining the insurance policy premium's price with the mortgage financing; offering the mortgage financing, coupled with the insurance premium, to the couple; if the couple accepts, creating a legally binding document memorializing the mortgage insurance policy, wherein the legally binding document sets forth terms and conditions of the mortgage insurance policy; transmitting the completed, legally binding document to the couple; periodically and regularly charging the calculated periodic amount to the couple; and administering the mortgage insurance policy in such a manner that, upon divorce or legal separation of the couple, paying damages arising from the piece of real estate and associated with the divorce or legal separation.

8 Claims, 1 Drawing Sheet

OTHER PUBLICATIONS

C. Valenti "The Future is Female" ABCNEWS.com, http://abcnews.go.com/sections/TheStreet/hottopics_000608.html, copyright 2000.

DuBroff, Divorce Insurance, 1976, The Barrister, vol. 3, No. 1, p. 16, 45-47.

F Impress "Divorce Insurance" Google Groups (Jun. 21, 1995).

F Impress "Divorce Insurance" Google Groups (Jun. 12, 1996).

F Impress "Divorce Insurance" Google Groups (Jun. 29, 1995).

G. Fagg "When Worlds Converge: Sorting out the complexities of credit insurance" Contingenices, pp. 24-28 (Jan. / Feb. 2003).

Golden, Breaking Up Without Going Broke, Mar. 1996, Boston Globe, p. 9.

Grande, The Proper Use of Insurance, 1975, Real Property, Probate and Trust Journal, vol. 10, p. 652-656.

Hijek, Barbara; FloriDUH, Weird, wacky, strange news from the Sunshine State, available at http://weblogs.sun-sentinel.com/news/specials/weirdflorida/blog/20... (posted Jul. 26, 2009).

Hutchens, Jason, Because Mainstream Personal Finance Advice is Not What It Should Be, How to Bet Against Your Marriage, available at http://badmoneyadvice.com/2010/09/how-to-bet-against-your-marria..., (posted Sep. 13, 2010).

J. De Rivaz "Divorce Insurance" Google Groups (Jul. 17, 1996).

J. De Rivaz "Divorce Insurance" Google Groups (Jun. 14, 1996).

J. De Rivaz "Insurance against financial loss through divorce" Google Groups (Mar. 26, 1996).

Leyva, Ellen; Need insurance for a divorce? Some say 'I Do,' available at http://abclocal.go.com/kabc/story?section=news/bizarre&id=7657391, (posted Sep. 8, 2010).

M. Fones "Don't Go 'Bare' Insurance Coverage Helps you Handle life's Sharp Curves" , Roadking.com, http://www.roadking.com/inside/story388.php, (posted Jul. 3, 2003).

Malveaux, Premarital 'insurance.'—prenuptial and cohabitation agreements, Feb. 1990, Essence.

Mealey, "Divorce insurance introduced in Australia", ABC Online, Aug. 9, 1999.

Mooney, Could Insurers Find Bliss in Divorce Market?, Aug. 2000, National Underwriter, pp. 19-21.

S, Eastman "Improving Outcomes for Divorced Women" (abstract), http://ideas.repec.org/a/cpp/issued/v18y1992i3p318-326.html (1992).

S. Chandra, "Protecting Ideas in the Insurance Business", New Yorks Times, (NYC, NY, US Jun. 30, 2003).

S. F. Schram "After Welfare: The Culture of Postindustrial Social Policy" http://www.nyupress.org/product_info.php?products_id=2152 (Mar. 1, 2000).

Same-sex marriage in the United States, (visited Aug. 25, 2008) http://en.wikipedia.org/wiki/Same-sex_marriage_in_the_United_States.

Stern, "The Spoils of Marriage" Newsweek, Dec. 11, 2000.

The Economist, "I do (conditions apply)," available at http://www.economist.com/node/21525426 (posted Aug. 6, 2011).

Warwick-Ching, Lucy, Just married? Check your divorce cover, Financial Times, available at http://www.ft.com/cms/s/0/adb04ebe-bd09-11e)-bdb1-00144feabdc0..., (posted Aug. 2, 2011).

zameer@ureach.com "Divorce Insurance", www.shoptheinternet.com, http://classifieds.shoptheinter.net/ads/ads_sel.idc?posting=14660 (May 29, 2003).

Rey, Evaluation of Gonadal Function in 107 Intersex Patients by Means of Serum Antimullerian Hormone Measurement, 1999, Journal of Clinical Endocrinology and Metabolism, vol. 84, No. 2, pp. 627-631.

Slijper, Long-Term Psychological Evaluation of Intersex Children, 1998, Archives of Sexual Behavior, vol. 27, No. 2, pp. 125-144.

Al-Attia, Gender Identity and Role in a Pedigree of Arabs with Intersex Due to 5 Alpha Reductase-2 Deficiency, 1996, Psychoneuroendocrinology, vol. 21, No. 8, pp. 651-665.

Vaughan, Fundamentals of Risk and Insurance, 1978, John Wiley & Sons, Inc., Second Edition, p. 89.

* cited by examiner

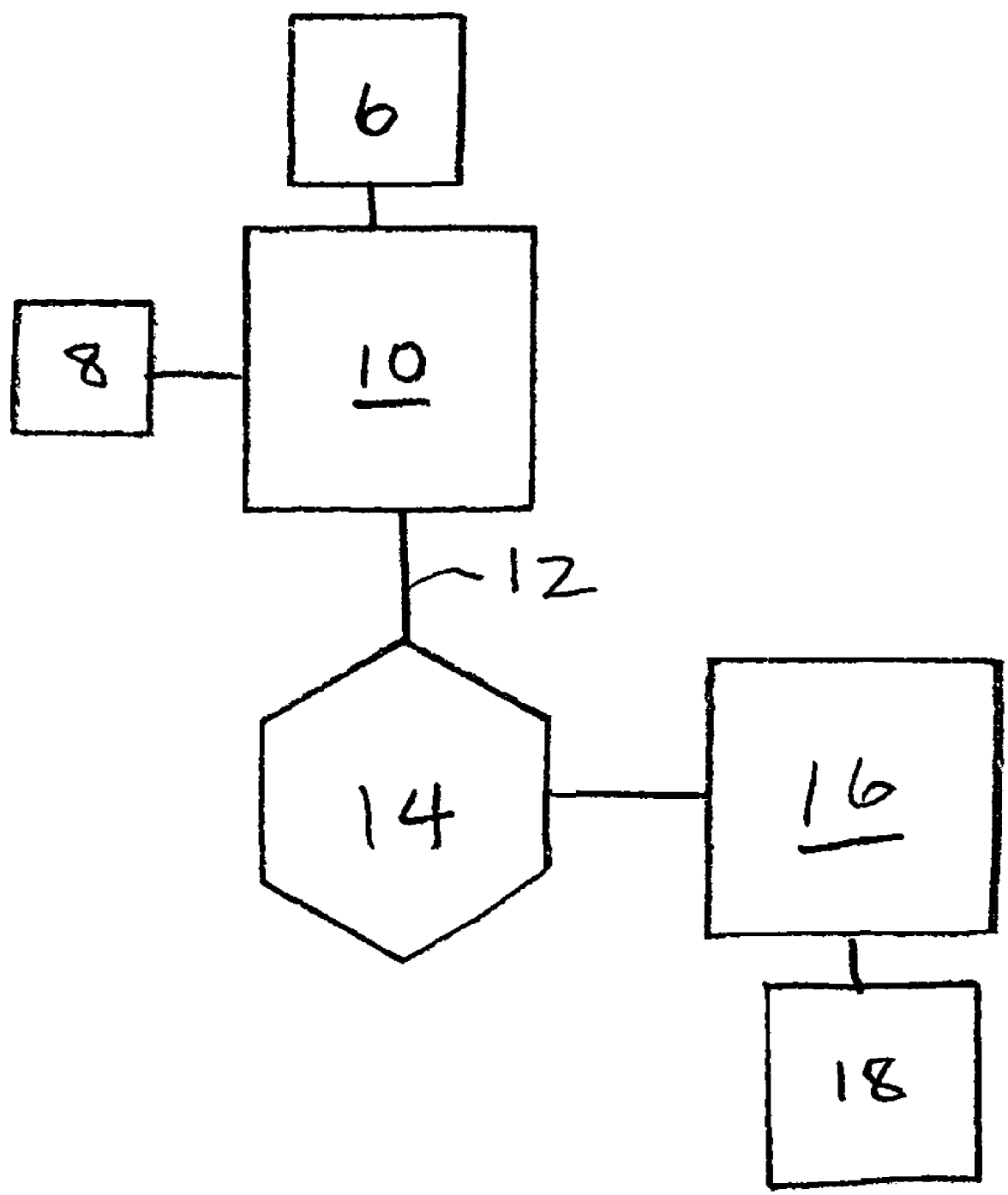

US 8,301,469 B1

MORTGAGE INSURANCE SYSTEM

CROSS-REFERENCE TO RELATED APPLICATION

This application claims the benefit of the filing date of U.S. Provisional Patent Application Ser. No. 61/132,994, filed Jun. 24, 2008, for "MORTGAGE INSURANCE BUSINESS METHOD", the contents of which are incorporated herein by this reference.

TECHNICAL FIELD

The invention relates to the field of business methods and associated systems in insurance, particularly mortgage finance insurance including coverage for termination of marriage or cohabitation contracts, be it through breach or mutual consent of the contracting parties or for other reasons. More particularly, the invention relates to businesses and systems (e.g., separation insurance) generally, and to mortgage finance insurance taking into consideration the potential of divorce (or legal separation) of the borrowers especially.

BACKGROUND

An unfortunate event in the life of many a pair or couple is a break up, separation or divorce. Sometimes, couples get married too early; sometimes after marrying they fall in love with someone else; sometimes the couple suffers a tragedy such as the loss of a child; and sometimes they suffer financial difficulties which make life together difficult. The couple breaks up. Whatever the reason behind a couple's divorce, there are generally serious financial consequences. This situation even extends to couples who are not married, but who are living together where "palimony" may be awarded.

Part of the financial problem associated with divorce is that associated with any mortgage the couple might have. Now, instead of the couple paying for their home, the couple supports two households with various redundancies in needs (e.g., rent, electricity, utilities). Failure to make payments leads to problems for the financial institution handling the mortgage.

In the US, the judicial system generally administers family law matters such as divorces. The court (or a court ordered commission) splits the marital estate and decides who pays the mortgage, which lives in the home, who is awarded custody of the children, assets, liabilities, and who pays child support and alimony. Even though there may be a court order ordering one member of the pair to pay the mortgage, that person may be reluctant to do so, particularly if he or she is not the one living in the house. Despite its best efforts, the judicial system leaves much to be desired in this highly personal and charged situation.

Besides the judicial system, people have tried various private methods to protect what they perceive to be their assets from the former spouse. Such private means have included prenuptial agreements, trusts, alternate dispute resolution, such as mediation, for splitting the marital property, etc. See, e.g., US Patent Application Publications US 2003/0074231 A1 to Renes et al. (Apr. 17, 2003), US 2003/0200124 A1 to Kiramittchian et al. (Oct. 23, 2003), and US 2005/038681 A1 to Covert (Feb. 17, 2005), the contents of each of which are incorporated herein in their entirety.

SUMMARY OF THE INVENTION

Disclosed are a method of doing business and associated system. The method comprises collecting information about applicants (e.g., a married or cohabiting heterosexual or homosexual couple or polygamous group) for a mortgage finance insurance policy that has a divorce or legal separation clause or rider. The applicants will typically be applying for financing or refinancing of a mortgage (which term, as used herein, includes not only traditional mortgages and associated loans, but land sales contract and trust deed financing) that includes periodic (e.g., monthly) payments. In the method and associated computer system, the information is transmitted (e.g., electronically such as via email or the Internet) to an entity for entry into a computerized software program. The entity calculates, using at least some of the collected information and via a computerized software program (that may be Internet based), a periodic amount that would be charged the pair by the entity for a separation insurance policy if the insurance policy were issued. Information concerning the periodic amount to be charged by the entity is transmitted to the pair for the pair's consideration. The insurance policy may be offered at the same time to the pair, or merely a preliminary offer might be transmitted (e.g., one based upon the confirmation of information about the pair). Once formally offered, the pair may accept or decline the offered separation insurance policy. Acceptance of the offer by the pair is communicated to the entity.

The entity then creates a legally binding document memorializing the insurance policy (e.g., an insurance contract) by transforming a blank document (e.g., electronic or paper) with at least some of the information provided by the pair, by computer or other electronic means, into a completed, legally binding document (e.g., a contract in the form of an unalterable, e.g., "pdf," document). A depiction of the completed, legally binding document setting forth the terms and conditions of the insurance policy may be transmitted electronically to a computer, where it is depicted on an associated video screen for, e.g., the applicants' and/or the salesperson's review and consideration. The completed, legally binding document sets forth the terms and conditions of the insurance policy. The entity then transmits the completed, legally binding document to the pair (e.g., by mail, courier, Internet or email depending on the document's form).

Going forward, the pair (or their agent) is periodically and regularly charged the calculated periodic amount. Likewise, periodically and regularly the periodic amount for the insurance policy is paid on behalf of the pair. The insurance policy is administered in such a manner that, upon divorce or legal separation of the pair, at least some of any remaining periodic payments under the mortgage to be charged the pair and/or damages associated with the divorce or separation are paid under the insurance policy.

Preferably, in the method, the entity only offers to the pair (and others similarly situated) mortgage loans having the separation insurance policy rider so that the separation insurance policy is, in effect, "compulsory" on couples seeking mortgage financing from the entity. Having an insurance policy for mortgage payments with a divorce insurance rider being "compulsory" on all potential consumers of mortgage financing reduces the likelihood of fraud being practiced against the insurer and allows the insurer to actuarially determine a price to be charged for the separation insurance policy of the invention.

The calculated periodic amount may be based, in part, on the pair's respective ages, the length of their marriage or other relationship, each member of the pair's socioeconomics, the value of real estate underlying the mortgage and/or the amount of equity the pair have in the underlying real estate, and the absence or presence of children.

The calculated periodic amount may be based or adjusted, in part, in view of changed circumstances. Such changed circumstances include inflation, deflation, educational achievement of the participant or the participant's partner, birth of a child, death of a child, disability of a participant, death of a partner, disability of a partner, return on investment of investments made with the periodic amounts, and any combination thereof.

Administering the insurance policy typically involves investing at least a portion of the periodic amount (e.g., for capital gains, dividends, and interest). The administration and the policy itself will also typically include utilizing means to prevent fraud.

In certain embodiments, the insurance policy will include a clause providing a payment at an end date of the policy if the pair remains together and does not divorce or separate.

In certain embodiments, the separation insurance policy comprises a clause for a minimum duration of the subject contractual relationship before any coverage is obtained. In certain preferred embodiments, the payment is dependent upon the pair periodically and regularly paying the entity the periodic amount for at least a period of two years, preferably a period of five years.

In certain embodiments, the separation insurance policy comprises a clause limiting coverage for a certain time interval after the initiation of the separation insurance policy.

In certain embodiments, an entity or a party not a member of the pair (e.g., one of the parties' parents or employer) periodically and regularly pays the periodic amount on behalf of the pair.

It would a significant improvement to the well-being of many if the risk of divorce or split up of a pair or couple with respect to, e.g., payment of a mortgage could be delayed and/or spread over a larger group of people, such as is the situation with health or life insurance. Such insurance could be voluntary or mandatory (e.g., as part of the mortgage loan in order to get a better rate of interest on the mortgage loan).

Accordingly, the invention includes providing a mortgage financing insurance policy that includes a provision for a pair divorcing or legally separating. The invention also includes a computer and associated computer program for administering the separation insurance policy of the invention.

BRIEF DESCRIPTION OF THE FIGURE

FIG. 1 is a block diagram depicting a system for processing and supervising separation insurance associated with a particular mortgage.

DETAILED DESCRIPTION OF THE INVENTION

Divorce insurance covers the financial damages associated with divorce. For example, it may include the direct costs of a divorce and/or the consequential damages of a divorce. In the instant case, it relates to insuring the risk associated with residential borrowers purchasing real estate with financing.

"Real estate", as used herein, will generally include a home. A home can include, for example any dwelling such as a single-family home, a condominium, cooperative, mobile home, vacant land for a home, a duplex, or a multiple dwelling unit building. It can also include commercial real estate including land and buildings.

Divorce insurance is "general insurance," somewhat similar to disability insurance. The primary characteristic of such insurance is not that, at a certain moment, it will play a role, but it covers merely the possibility of an uncertain future unfortunate event. That is, with divorce, a question. For instance, divorce can be at one's own instigation. In insurance, liability is however generally based upon events outside the control of the insured parties.

If a divorce occurs (for whatever reason), that can be seen as an external event, then at least the conditions for "coverage of damage" have been met.

Accordingly, divorce insurance is a complicated product for an insurer to price and actuarially determine risk. Due to, for instance, the potential for fraud, e.g., people ("self-selectors") who know they are unhappy in their relationship can apply for insurance (also called "self-selection").

Rather than being dependent on chance, divorce, by definition, occurs at the request of the insured and/or his or her partner. Insured people can have foreknowledge of troubles in their relationship, which the insurer does not have, and in this way, the potential for fraud applies. The divorce insurer has no simple selection mechanism, such as conducting a physical examination as in disability insurance.

The insurer offering divorce insurance can, however, reduce these risks. For example, benefits follow only after the insurance has run for a number of years. Or by offering limited coverage, e.g., the insurer pays only a fixed benefit. The benefit is limited to reduce potential losses.

Another issue is that divorce is not irreversible. The insured person may—if he or she does not already foresee it—again marry or cohabit with his or her ex-spouse. Divorce damages can then be partially covered, as a result of which, the insurance benefit can be afterwards larger than the premiums. These reasons make divorce insurance considerably susceptible to fraud and therefore sharp acceptance guidelines must be established, which protects the insurer against fraud.

For a determination of risk and premium calculation, sufficiently relevant data is available. For instance, in the Netherlands, Central Bureaus of Statistics, or "C.B.S." has developed statistics on marriage and divorce. The general chance of divorce can be readily determined, from which a premium can be calculated. However, the data are lacking for chances and premiums by commencement age at calculation. Although somewhat based upon data collected and analyzed in the Netherlands, the data should be also applicable to the United States, with possible modifications due to legal constraints and demographic other associated factors.

Also, with respect to divorce factors that stipulate the chance of divorce and the costs of divorce in the Netherlands, this research has been particularly performed by the C.B.S., and the Netherlands Interdisciplinary Demographic Institute (or the NIDI).

For married or co-habiting candidates choosing divorce insurance voluntarily, fraud potentially plays a large role in choosing to obtain the insurance. The insurance candidate knows how well the marriage or relationship is going, but the insurer does not have this knowledge or information. Obtaining this information is not very easy for the insurer. This situation makes it (for an insurer) very difficult to determine a fair premium justified solely on the basis of general statistics and other demographic or socioeconomic divorce factors. Accordingly, offering "voluntary" divorce insurance is less preferred.

If divorce insurance tied to mortgage financing of real estate is entered into with a more established marriage (e.g., dependent on the length of time of the marriage and the presence of children), the potential for fraud should be less. However, even then, that does not exclude the potential that the marriage or insurance policy was entered into with a view to obtaining the benefits of the insurance, and afterwards possible renewed cohabitation. Also here, "mail order brides" are a potential problem. Thus, it seems, for a commercially very attractive group, chosen with very good selection techniques and protected with strict insurance conditions, a solution could be found. Drafting and testing thorough, well thought out questionnaires, etc., for gathering information (e.g., electronically or on the Internet) is preferred.

With respect to insurance having a compulsory divorce insurance rider, the potential for fraud is lessened. Insurance can be thought linked to a product, e.g., to a mortgage or similar trust deed financing. However, laws against discrimination must of course be obeyed.

In the Netherlands, for instance, traditional marriage is still very dominant, but there are, of course, other types of households. The impact of breaking up a relationship will be for unmarried partners living together frequently just as serious as for married people. However, because little data exists for these other households (e.g., no registry of births, deaths and marriages exists for unmarried partners living together (irrespective of the presence or absence of a written cohabitation agreement)) and absent data from this group, it would be very difficult to offer them insurance.

Capital insurance, which gives a lump sum payment, could cover both the direct and consequential damages of divorce or separation.

Direct damage are those damages that arise from the divorce itself, such as the costs of a lawyer, a notary public (in certain countries), court fees, and moving expenses. Also, the capital benefit could cover the payment of the mortgage interest or other payments (at least temporarily), so that the underlying home need not be sold in haste at a "fire sale." Insuring direct damage is not contrary to the general insurance philosophy, laws, or regulations.

To cover consequential damages, by means of capital insurance where the capital (amount invested in the insurance) would preferably limit the amount of consequential damages to no more than the amount of premium paid.

An insurance policy which, after divorce, pays periodically to cover the consequential damages of divorce is possible, under the condition that the benefit terminates or is adapted at remarriage or cohabitation with the ex-partner or a new partner. Then, consequential damages (partly) would be complete. Such conditions would mean that the interest benefit is an entitlement.

Concealing later cohabitation would, of course, improperly produce a benefit to the insured couple. In the insurance contract created between the parties, provisions are preferably incorporated to take into consideration improper benefits under the policy. In general, the insurance could be cancelled on a yearly basis by the insured person or insurance entity. Such a provision would preferably be included in a voluntary divorce insurance policy to reduce the potential for fraud. Such a provision is less necessary for compulsory insurance.

General insurances are not generally entered into where premium payments are included in the purchase price. There are however exceptions, such as unemployment insurance, which cover the associated damages, and are entered into upon financing a mortgage on the underlying real estate (e.g., a house). The purchase price of the unemployment insurance can thus be financed with the house financing. Divorce insurance can be also entered into against purchase price, for example, in the same manner as unemployment insurance, but taking the disclosure hereof into consideration.

For instance, the net purchase price together with the cash value of the sum of the chance of divorce in year t of insured the period with insured the benefit in year t of insured the period has been multiplied. The years t run from the beginning to the end of insured the period. The purchase price to pay the net purchase price raises with costs.

For calculating the chance of divorce, data sufficient are available by means of statistics and demographics, which, in general, influence the chance of divorce. Thereafter, the premium for divorce insurance is calculated. A problem of divorce insurance is the potential fraud of the insured people and unavailability of divorce to unmarried households. The potential for fraud make it very difficult for the insurer, as a matter of voluntary insurance, to determine premiums. The unavailability of divorce to unmarried couples could eventually give rise to problems with, e.g., state insurance regulations. Thus, voluntary divorce insurance is only possible using the strictest criteria, screening, and scrutiny. Compulsory insurance is thus preferred.

A mortgage financing insurance policy of the invention for the compensation of financial consequences of ending a marriage by divorce can be relatively straightforward. It can consist of only one installment (which will typically be rather high) or weekly, monthly, or yearly (or any other term) installments with respect to the underlying real estate. Payments preferably start with the mortgage. They can be entered into by the (future) contract partners, or by entities wishing to provide at least one such a (future) contract partner with such insurance. They can be entered into at any age of the (future) contract parties.

The monies paid can be purely fees for the insured financial risks, but they can also be (partially) investments in stock and the like, which may provide for a sum to be paid at a certain end date of the separation insurance policy. Such an end date may be the event that was insured, but it may also be a certain duration of the contractual relationship, or the reaching of a certain age of a contract partners or both partners. It may also be the passing away of one of the partners. This way the separation insurance policy becomes part of another (life) insurance policy. In similar ways, the separation insurance policy can be part of another insurance policy or comprise (parts of) other insurance policies.

The separation insurance policy of the invention may also comprise other contractual arrangements or made part of another contract such as an employment contract (e.g., offered as an employee benefit). Also, although the insurance payment may be limited to a payment of the mortgage for a fixed period of time to avoid a "fire sale" (e.g., from six months to two years), the financial consequences to be covered could also be simply a fixed payment of an amount of money, or by, for example, reimbursement of legal fees, covering moving costs and clean up costs for the real estate, or making alimony payments or children support payments (e.g., for children resulting from the contractual relationship) or a combination of the above and similar costs to be expected.

The monies required to be paid for such insurance depends on many different parameters. It depends on the age at which the policy is entered. It depends on the demographics of the area where the contract partners are.

The amount to be charged depends on several items associated with the value of the policy. For instance, it could depend on the age of the contracting partners. It could depend on the investments to be made and historical returns on investments, etc. Once apprized of the invention, people of skill in the art in designing insurance policies will be capable of designing suitable policies and using them. As a simple example, any personal insurance giving payment at a certain age can be modified to accommodate the invention.

The amount to be charged (i.e., the premium) could be increased as the number of children increases. The amounts for the premium could be decreased as a child passes a certain age (e.g., 18 or 21 years). As with "universal life" polices, the premiums could be refunded if there were no divorce by a certain, predetermined age of the insured (e.g., 55, 60, or 65 or any other suitable age to be determined by the particular circumstances).

The invention preferably involves a method of doing business which includes determining a periodic (e.g., monthly, semiannually or annually) amount to be charged a prospective participant for divorce insurance; charging that periodic amount (or "premium") to a participant in an insurance program over a period of time; and administering the insurance program (e.g., confirm that a divorce has or has not occurred, receiving and making payments, etc.)

The pair may receive a reduced interest rate on the underlying mortgage financing in consideration for paying for a divorce insurance policy clause in the mortgage financing. If divorce or separation of the pair occurs during the term of the mortgage insurance policy, the reduced interest rate could reverse, and the pair owes the entity a higher interest rate retroactively to the mortgage insurance policy's origination date.

The amount to be charged a prospective participant will generally be based upon the prospective participant's age and the prospective participant's spouse or partner's age, both at the time of the marriage and at the time of paying the particular premium. The amount to be charged will also typically be based, in part, on the prospective participant's projected earnings and/or the prospective participant's spouse's projected earnings. The amount charged a participant can be changed in view of changed circumstances in the lifestyle (e.g., income or health) of the participant. Other changed circumstances include inflation, deflation, educational achievement of the participant or the participant's spouse, birth of a child, death of a child, disability of a participant, disability of a spouse, return on investment of investments made with the periodic amounts, and any combination thereof.

Analysis for socioeconomic/demographic factors of the couple (e.g., age, age difference between the respective members of the couple, educational backgrounds, previous marital status, health of the respective partners, whether or not the couple already has children), projected inflation rate over the life of the policy, projected investment return over the life of the policy, assets of the respective partners, and life styles to which the members of the couple have become accustomed or will likely be accustomed can be conducted by the insurance company. For example, people with less chance of a divorce could be charged a lower premium.

Once determined and collected, at least a portion of the periodic amount will be invested by the insurance company in appropriate investments. Such investments are well known to those of skill in the art, but generally include, stocks, bonds, bank accounts, fixed income investments, venture capital investments, and so forth. Once invested, the collected funds should grow for eventual distribution to either participants or owners of the insurance company.

In order to collect on the policy, satisfactory proof of divorce (e.g., certified copies of court documents) would preferably need to be provided to the insurance company (or otherwise collected by the insurance company) and certifications made to insure that the couple has actually physically separated before payment was made. Continuing certification that the couple remains separated could be required (e.g., annually) before payments under the policy are continued. If a couple remarries, a refund of at least some of the payments made could be required, although this is not necessary in all embodiments and circumstances.

Payments on behalf of the participant (e.g., to the mortgage holder or former partner or spouse) would be preferably made over time, with few or no lump sum payments thus decreasing the impetus for any fraud. The requirement to pay premiums could be continued after the divorce or separation not unlike health insurance premiums. Payments for child support preferably cease when a child reaches 18 or 21 (if the child attends post-secondary education, for example, goes to college). Alimony payments could cease or be reduced when the former partner gets a job or remarries.

As with all insurance policies, the policy of the instant invention has a potential for abuse (e.g., by fraud). Preferably, the policy will include contractual features to prevent such fraud. For instance, the policy could include a waiting period (e.g., three (3) to five (5) years or any other time period) before the policy becomes effective. If the couple separates earlier than the time period, premiums could be refunded with or without interest. Furthermore, if the couples remarries or cohabitates for a long time period after separation or divorce, payments should cease and perhaps repayment made to the insurer.

As with most businesses nowadays, the offering and administration of the program could be administered and operated as an on-line business.

The separation insurance policy is administered with the aid of a computer or computers and associated software. Such software will typically run on a netbook, main frame or other commercially available computer that includes a central processing unit, memory, data files, and associated storage. It will typically be used to print up the policy on a commercially available printer or display aspects of the policy on a video monitor.

As described herein, in various embodiments, one or more server(s), client computer(s), application computer(s) and/or other computer(s) can be utilized to implement one or more aspect of the invention. Illustrative computers can include, for example: a central processing unit; memory (e.g., RAM, etc.); data storage (e.g., hard drives, etc.); input/output ports (e.g., parallel and/or serial ports, etc.); data entry devices (e.g., key boards, etc.); etc. In addition, client computers may contain, in some embodiments, browser software for interacting with the server(s), such as, for example, using hypertext transfer protocol (HTTP) to make requests of the server(s) via the Internet or the like.

A netbook is a small portable laptop computer designed for wireless communication and access to the Internet. Primarily designed for web browsing and e-mailing, netbooks rely heavily on the Internet for remote access to web-based applications and are targeted increasingly at cloud computing users who require a less powerful client computer. Netbooks typically run either Windows XP or Linux operating systems rather than more resource-intensive operating systems like Windows Vista. Netbooks tend to range in size from below 5 inches to over 13 inches, typically weigh about a kilogram, and are often significantly less expensive than general purpose laptops.

According to Deloitte, as of the start of 2009, the established definition of a netbook was a notebook computer with a low-powered x86-compatible processor (compatible with PC standard software), small screen (no larger than 10 inches), (usually) small keyboard, equipped with wireless connectivity, lightweight (under three pounds/1.3 kilograms) and no optical disk drive. Netbooks are typically low cost, relative to other notebooks.

During the application process, a computerized form will typically be required to be filled out by the prospective participants. The data from the form can be utilized by the computer or netbook and associated network to determine a periodic amount.

The computer's software preferably includes means for determining a periodic amount to be charged a prospective participant for divorce insurance. It also preferably includes means for charging that periodic amount to a participant in an insurance program over a period of time (e.g., by printing and sending bills or invoices and receiving payments, for example, electronically). It will also preferably include means for administering the insurance program.

For instance, in determining the amount to be charged, the software can determine the amount to be charged a prospective participant based, at least in part, on the prospective participant's age and the prospective participant's partner's age. The software can also determine the amount to be charged based, in part, on the prospective participant's projected earnings or on the prospective participant's partner's projected earnings. The computer software can also determine the amount to be charged based on the regularity of the periodic payments (e.g., monthly, quarterly, semiannually, or annually).

The amount to be charged a participant can change in view of changed circumstances in the participant's life or environment. For example, the computer software can receive and interpret information such as prevailing interest rates, the inflation rate, the deflation situation, the economic perspective, or, on a more personal level, educational achievement of the participant or the participant's partner or child, birth of a child, death of a child, disability of a participant, disability of a partner, return on investment of investments made with the periodic amounts, and any combination thereof.

The computer software can also be used to determine the amount to be paid out under the policy. For example, it can take the foregoing information into consideration and be used to determine what sort of support a former spouse or partner needs dependent on general and specific circumstances (e.g., rent or house payments, health of the former partner and any children, educational requirement of the former partner and any children, cost of living, etc.).

The software or computer can also be used to assist in investing at least a portion of the periodic amount. It can also be used to administer the program by, for example, including names and relevant information in a database (which are commercially available).

The risks associated with the separation insurance policy can be offset, to some degree, by requiring the payment of a pre-determined percentage of any increase in value in the underlying real estate to the insurer in the event the couple divorces or legally separates.

In a preferred embodiment, the invention includes, in combination, a system (FIG. 1) for processing and supervising divorce insurance associated with a particular mortgage. Such a system comprises, e.g., a website, an insurance agent, loan officer, real estate agent, real estate broker, and/or mortgage agent who collects and enters information about a pair of applicants for a financing insurance policy having a divorce or legal separation clause, wherein the pair is also applying for financing of refinancing of a mortgage that includes periodic payments. The information is collected and entered into, a computer 10 (or terminal, netbook or similar device) via, e.g., keyboard 8 and transmitted (e.g., by email, telephone modem connection, telephone call, or internet connection 12) to an entity 14 for entry (either directly or indirectly) into a computerized software program associated with a computer 16 preferably dedicated to this purpose.

The computerized software program will typically have access to third party databases (e.g., credit bureau histories, associated analyses and scoring, and current prevailing interest rates for mortgage loans) for further assessing the applicants for insurance and determining an amount to be charged. These third party databases also are preferably used to verify the information provided by the applicants.

The entity calculates, using at least some of the collected information and the third party information and via the computerized software program, a periodic amount that would be charged the pair for the separation insurance policy by the entity if the separation insurance policy were issued. The information concerning the periodic amount to be charged is transmitted by the entity directly or indirectly to the pair for the pair's consideration (e.g., by depiction on a video monitor 6 associated with the first computer, terminal, or similar device 10), and may then offer the separation insurance policy to the pair. In certain embodiments, she pair then may accept or decline the offered separation insurance policy.

In certain embodiments (e.g., when the divorce or separation insurance is compulsory with the mortgage lender), the information is transmitted to the mortgage loan officer or other similarly situated person, and the amount of the insurance is automatically included within the price of the mortgage loan and the entire package is offered to the applicants.

Upon accepting the offered separation insurance policy, acceptance of the offer by the pair is communicated to the entity (e.g., by the interne, real estate agent or broker, loan officer, or a network entry point). A legally binding document memorializing the separation insurance policy is created wherein the completed, legally binding document sets forth terms and conditions of said separation insurance policy. The document may be printed on a printer 18 associated with the computer software 16 or printed electronically (e.g., as a .pdf with software commercially available from, e.g., Adobe® (Acrobat®) or Microsoft® (Word®) and appropriately communicated to the applicants either directly or indirectly through their loan officer or agent.

Periodically and regularly the pair is charged the periodic amount determined by the software (e.g., by email or other billings). The pair regularly pays the periodic amount for the separation insurance policy (e.g., by electronic transfer or other payment system).

In the event of a divorce or legal separation of the pair, the event is reported to the entity, and at least some of any remaining periodic payments under the mortgage to be charged the pair are paid under the separation insurance policy (or other policy events take place, e.g., payment of moving costs, payment to spruce up the property, etc.)

Although the invention has been described with some degree of particularity in order to thoroughly explain it, after being apprized of the invention, those of skill in the art will be able to adapt it from the particular details given herein without departing from its full scope.

TABLE 1

Transaction Example for a single payment of $10,000
(3 year restricted period, 5 year
insured period, 20% costs, 3% interest)

| Length of marriage in full years | Gross purchase price ($10K 1$^{st}$ period) | Gross purchase price ($10K periods after 1$^{st}$ period) |
|---|---|---|
| 0 | 572 | 949 |
| 1 | 530 | 112 |

TABLE 1-continued

Transaction Example for a single payment of $10,000
(3 year restricted period, 5 year
insured period, 20% costs, 3% interest)

| Length of marriage in full years | Gross purchase price ($10K 1st period) | Gross purchase price ($10K periods after 1st period) |
|---|---|---|
| 2 | 485 | 123 |
| 3 | 457 | 1241 |
| 4 | 450 | 1241 |
| 5 | 457 | 1221 |
| 6 | 456 | 1194 |
| 7 | 438 | 115 |
| 8 | 410 | 1101 |
| 9 | 383 | 104 |
| 10 | 357 | 975 |
| 11 | 337 | 927 |
| 12 | 323 | 894 |
| 13 | 308 | 858 |
| 14 | 298 | 831 |
| 15 | 293 | 807 |
| 16 | 288 | 787 |
| 17 | 283 | 773 |
| 18 | 272 | 747 |
| 19 | 256 | 705 |
| 20 | 235 | 650 |
| 21 | 218 | 605 |
| 22 | 202 | 563 |
| 23 | 185 | 521 |
| 24 | 169 | 479 |
| 25 | 151 | 429 |
| 26 | 133 | 379 |
| 27 | 117 | 338 |
| 28 | 101 | 296 |
| 29 | 86 | 256 |
| 30 | 73 | 224 |
| 31 | 62 | 194 |
| 32 | 55 | 172 |
| 33 | 51 | 155 |
| 34 | 48 | 142 |
| 35 | 44 | 130 |
| 36 | 41 | 123 |
| 37 | 38 | 117 |
| 38 | 34 | 110 |
| 39 | 30 | 101 |
| 40 | 25 | 90 |

TABLE 2

Transaction Example for a single payment of $10,000
(3 year restricted period, 10 year
insured period, 20% costs, 3% interest)

| Length of marriage in full years | Gross purchase price ($10K 1st period) | Gross purchase price ($10K periods after 1st period) |
|---|---|---|
| 0 | 1790 | 2168 |
| 1 | 1612 | 2206 |
| 2 | 1519 | 2271 |
| 3 | 1455 | 2239 |
| 4 | 1438 | 2230 |
| 5 | 1430 | 2193 |
| 6 | 1396 | 2134 |
| 7 | 1330 | 2051 |
| 8 | 1237 | 1928 |
| 9 | 1148 | 1808 |
| 10 | 1066 | 1685 |
| 11 | 1008 | 1599 |
| 12 | 971 | 1542 |
| 13 | 935 | 1485 |
| 14 | 909 | 1442 |
| 15 | 888 | 1402 |
| 16 | 867 | 1366 |
| 17 | 848 | 1338 |
| 18 | 810 | 1285 |
| 19 | 757 | 1207 |
| 20 | 690 | 1105 |
| 21 | 634 | 1020 |
| 22 | 582 | 943 |
| 23 | 528 | 863 |
| 24 | 477 | 787 |
| 25 | 418 | 696 |
| 26 | 357 | 603 |
| 27 | 310 | 530 |
| 28 | 263 | 458 |
| 29 | 223 | 393 |
| 30 | 193 | 343 |
| 31 | 167 | 300 |
| 32 | 150 | 267 |
| 33 | 136 | 240 |
| 34 | 123 | 217 |
| 35 | 109 | 195 |
| 36 | 95 | 177 |
| 37 | 84 | 163 |
| 38 | 73 | 149 |
| 39 | 64 | 134 |
| 40 | 56 | 120 |

TABLE 3

Chance of a divorce (1st column "Year of marriage," and each year thereafter).

| | 0 | 1 | 2 | 3 | 4 | 5 | 6 | 7 | 8 | 9 |
|---|---|---|---|---|---|---|---|---|---|---|
| 1996 | 0.001 | 0.009 | 0.022 | 0.030 | 0.040 | 0.042 | 0.033 | 0.026 | 0.024 | 0.023 |
| 1997 | 0.001 | 0.010 | 0.019 | 0.025 | 0.037 | 0.038 | 0.035 | 0.030 | 0.024 | 0.023 |
| 1998 | 0.001 | 0.011 | 0.020 | 0.020 | 0.029 | 0.032 | 0.029 | 0.027 | 0.026 | nvt |
| 1999 | 0.001 | 0.011 | 0.020 | 0.022 | 0.024 | 0.026 | 0.027 | 0.026 | nvt | nvt |
| 2000 | 0.001 | 0.013 | 0.022 | 0.024 | 0.025 | 0.022 | 0.025 | nvt | nvt | nvt |
| 2001 | 0.001 | 0.013 | 0.025 | 0.027 | 0.029 | 0.027 | nvt | nvt | nvt | nvt |
| 2002 | 0.001 | 0.008 | 0.017 | 0.022 | 0.025 | nvt | nvt | nvt | nvt | nvt |
| 2003 | 0.001 | 0.008 | 0.016 | 0.017 | nvt | nvt | nvt | nvt | nvt | nvt |
| 2004 | 0.001 | 0.009 | 0.018 | nvt | nvt | nvt | nvt | nvt | nvt | nvt |
| 2005 | 0.001 | 0.009 | nvt | nvt | nvt | nvt | nvt | nvt | nvt | nvt |
| 2006 | 0.001 | nvt | nvt | nvt | nvt | nvt | nvt | nvt | nvt | nvt |
| Gemiddeld | 0.001 | 0.010 | 0.020 | 0.023 | 0.030 | 0.031 | 0.030 | 0.027 | 0.025 | 0.023 |

What is claimed is:

1. A process for generating an insurance quote to be charged applicants for a mortgage loan from a lender, wherein the mortgage loan is intended to fund a purchase of real estate by the applicants, the applicants comprise a legally cohabiting couple intending to purchase the real estate, and
   the insurance quote is for insurance insuring the legal separation or divorce of the legally cohabiting couple and is for the benefit of the applicants, the process comprising:
   gathering cohabitation data from the applicants concerning their cohabitation;
   entering the gathered cohabitation data into a computer comprising a central processing unit and memory storage means;
   determining the acceptability of the mortgage loan for the applicants and depicting the acceptability on a video monitor associated with the computer;
   obtaining data from a lender's electronic database, wherein at least a first portion of the data in the lender's electronic database is provided to the lender by the applicants in connection with obtaining the mortgage loan from the lender;
   automatically underwriting an insurance risk for purchase of the real estate in view of the data and the cohabitation data;
   generating the insurance quote for payments from the applicants to start with the mortgage utilizing the data obtained from the lender's electronic database, the insurance quote being for the provision of insurance to cover purchase of the real estate intended to be purchased by the applicants and for the direct benefit of the applicants using the mortgage loan upon the event of the divorce or legal separation of the applicants; and
   advising the applicants of the acceptability of the mortgage loan and providing the insurance quote to the applicants contemporaneously therewith if the mortgage loan has been accepted; wherein the applicants receive a reduced interest rate on the underlying mortgage financing to purchase the real estate is conditional upon acceptance of the insurance and entry into a contract therefor; wherein, if divorce or separation of the applicants occurs during the term of the insurance, the reduced interest rate reverses, and the pair owes the entity a higher interest rate retroactively to the insurance's origination date.

2. The process of claim 1, wherein the insurance quote is provided by the lender.

3. The process of claim 1, wherein the insurance quote is provided by an insurance provider.

4. The process of claim 1, wherein underwriting the insurance risk further comprises:
   providing a plurality of insurance companies for underwriting the insurance risk; and
   determining a set of terms for each of the plurality of insurance companies for which each of the plurality of insurance companies will accept the insurance risk.

5. The process of claim 1, wherein issuance of the mortgage loan to allow the applicants to purchase the real estate is conditional upon acceptance of the insurance and entry into a contract therefor.

6. The process of claim 1, further comprising:
   storing the data in the computer after providing the insurance quote; and
   providing an additional insurance quote in response to a request by the applicants.

7. The process of claim 1, wherein a second portion of the data is obtained from a credit bureau.

8. The method according to claim 1, wherein the mortgage insurance policy comprises a clause providing a payment to the applicants at an end date of the policy if the applicants remain together.

* * * * *

UNITED STATES PATENT AND TRADEMARK OFFICE
CERTIFICATE OF CORRECTION

PATENT NO. : 8,301,469 B1  
APPLICATION NO. : 12/456874  
DATED : October 30, 2012  
INVENTOR(S) : Veldhuizen et al.

Page 1 of 1

It is certified that error appears in the above-identified patent and that said Letters Patent is hereby corrected as shown below:

On the title page:
In ITEM [54] TITLE and in the specification COLUMN 1, LINE 1     change "MORTAGE" to --SEPARATION--

In the specification:
    COLUMN 10, LINE 26,     change "interne," to --internet,--

Signed and Sealed this  
Twenty-fourth Day of December, 2013

Margaret A. Focarino  
*Commissioner for Patents of the United States Patent and Trademark Office*